US008718022B2

(12) United States Patent
Aoyama (10) Patent No.: US 8,718,022 B2
(45) Date of Patent: *May 6, 2014

(54) METHOD OF COLLECTING INFORMATION IN MOBILE COMMUNICATION SYSTEM

(75) Inventor: Akio Aoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 12/978,168

(22) Filed: Dec. 23, 2010

(65) Prior Publication Data

US 2011/0090812 A1    Apr. 21, 2011

Related U.S. Application Data

(63) Continuation of application No. 10/700,483, filed on Nov. 5, 2003.

(30) Foreign Application Priority Data

Nov. 14, 2002    (JP) .................................. 2002-330734

(51) Int. Cl.
    *H04B 7/216*    (2006.01)
(52) U.S. Cl.
    USPC ........... 370/335; 370/336; 370/252; 370/329; 370/338; 370/330; 455/456.1; 455/456.2; 455/404.2; 455/67.11; 455/513; 345/660; 345/619; 379/32; 379/59; 379/60
(58) Field of Classification Search
    USPC ......... 370/335, 342, 341, 336, 252, 329, 330, 370/280, 338, 328; 455/453, 513, 456.1, 455/456.2, 404.2, 507, 410, 67.11, 404, 455/423, 456; 345/660, 619; 379/32, 59, 379/60, 21
    See application file for complete search history.

(56) References Cited

U.S. PATENT DOCUMENTS

| 5,946,612 A * | 8/1999 | Johansson ..................... 455/405 |
| 6,047,191 A | 4/2000 | Desgagne | |
| 6,169,896 B1 * | 1/2001 | Sant et al. ..................... 455/424 |

(Continued)

FOREIGN PATENT DOCUMENTS

| JP | 11-027729 | 1/1999 |
| JP | 2000-125343 | 4/2000 |

(Continued)

OTHER PUBLICATIONS

Japanese Office Action dated Nov. 8, 2011 (with a partial English translation).

*Primary Examiner* — Patrick Edouard
*Assistant Examiner* — Fred Casca
(74) *Attorney, Agent, or Firm* — McGinn IP Law Group, PLLC (57) ABSTRACT

There are disclosed a method of and a system for collecting information related to operation of a radio communication system inexpensively and easily. A mobile radio terminal monitors a communication status of user communication, and detects as a trigger when the communication status has satisfied a predetermined condition. When a trigger is detected, the mobile radio terminal acquires a reception status of a radio signal and the position of the mobile radio terminal. The mobile radio terminal sends measured information including the reception status and the position to an information collecting server. The information collecting server receives the measured information from the mobile radio terminal and records therein the measured information which has been received.

35 Claims, 5 Drawing Sheets

(56) References Cited

U.S. PATENT DOCUMENTS

| | | |
|---|---|---|
| 6,304,754 B1 | 10/2001 | DeSantis et al. |
| 6,466,797 B1 * | 10/2002 | Frodigh et al. ............ 455/456.1 |
| 6,687,226 B1 * | 2/2004 | Galyas ........................ 370/231 |
| 6,728,233 B1 * | 4/2004 | Park et al. .................... 370/342 |
| 6,982,949 B2 | 1/2006 | Guo et al. |
| 2002/0065604 A1 | 5/2002 | Sekiyama |
| 2002/0127993 A1 * | 9/2002 | Zappala ........................ 455/404 |
| 2002/0141362 A1 * | 10/2002 | Hsu et al. ..................... 370/331 |
| 2003/0148765 A1 * | 8/2003 | Ma et al. ...................... 455/438 |
| 2004/0038687 A1 * | 2/2004 | Nelson ....................... 455/456.1 |
| 2004/0192211 A1 | 9/2004 | Gallagher et al. |
| 2004/0203717 A1 * | 10/2004 | Wingrowicz et al. ...... 455/456.1 |
| 2004/0203855 A1 * | 10/2004 | Veerasamy et al. ........ 455/456.1 |
| 2004/0203885 A1 | 10/2004 | Quaid |
| 2005/0020206 A1 * | 1/2005 | Leeper et al. ................ 455/41.2 |
| 2005/0245250 A1 | 11/2005 | Ebenshpanger |

FOREIGN PATENT DOCUMENTS

| | | |
|---|---|---|
| JP | 2000-341204 | 12/2000 |
| JP | 2001-36462 | 2/2001 |
| JP | 2001-136121 | 5/2001 |
| JP | 2001-285923 | 10/2001 |
| JP | 2002-009713 | 1/2002 |
| JP | 2002-034079 | 1/2002 |
| JP | 2002-94447 | 3/2002 |
| JP | 2002-152104 | 5/2002 |
| JP | 2002-197232 | 7/2002 |
| JP | 2002-204202 | 7/2002 |
| JP | 2002-232344 | 8/2002 |
| JP | 2002-271833 | 9/2002 |
| JP | 2002-300100 | 10/2002 |
| WO | WO 96/19088 | 6/1996 |

* cited by examiner

METHOD OF COLLECTING INFORMATION IN MOBILE COMMUNICATION SYSTEM

This application is a Continuation Application of U.S. patent application Ser. No. 10/700,483, filed on Nov. 5, 2003, which, in turn, has foreign priority based on Japanese Application No. 2002-330734, filed on Nov. 14, 2002.

BACKGROUND OF THE INVENTION

1. Field of the Invention

The present invention relates to a radio communication system, and more particularly to the collection of measured values of reception statuses for the maintenance and optimization of a radio communication system.

2. Description of the Related Art

At present, efforts are being made to lower charges to be paid by subscribers to radio communication systems such as cellular phone systems, PHS, public radio LAN systems, etc. One of the efforts is to lower the operating costs of radio communication systems as much as possible. It is a large task for communication service providers to make less costly adjustments for the maintenance and optimization of radio communication systems.

The adjustments for the maintenance and optimization of radio communication systems include maintenance and adjustment activities that are performed to operate the radio communication systems stably without system failures over a long period of time. Items that need to be adjusted include, for example, the transmission power level of a radio base station and the tilt angle of an antenna.

The maintenance and adjustment of a radio communication system are generally performed based on an evaluation or examination process which employs a radio network design simulator. In order to increase the accuracy of a simulation, information about reception statuses that are measured in service areas (hereinafter referred to as "coverages") of the radio communication system and information about positions where measured values are obtained are input to the design simulator.

In a CDMA system, for example, items of reception status information include the received signal quality and received signal intensity of a common pilot channel. These items of reception status information are useful items indispensable for system maintenance and adjustments because they serve as indexes for determining whether the services of the radio communication system are available to mobile radio terminals in the measured position or not.

Figure 1:
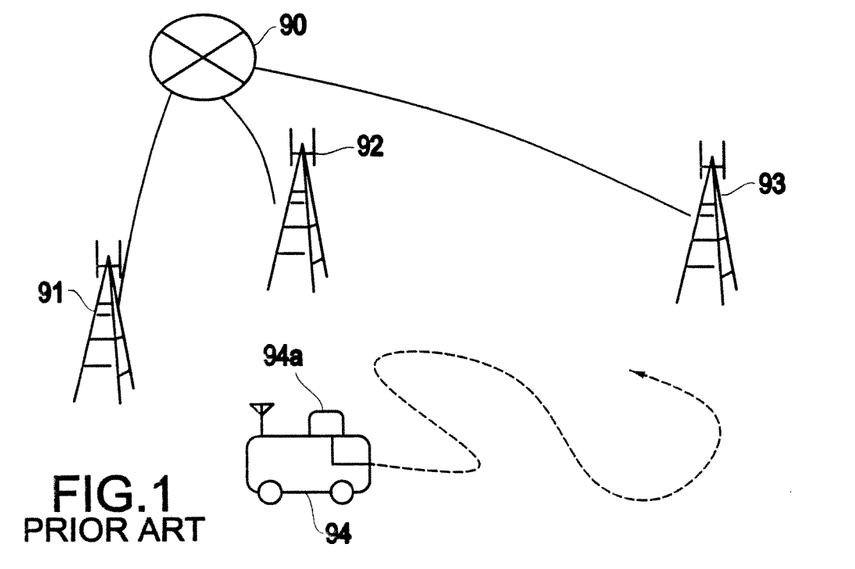
FIG. 1 is a schematic view illustrative of a conventional process of collecting reception status information from a radio communication system.

Heretofore, it has been customary for a dedicated measuring vehicle or a dedicated measuring team to measure reception status information. FIG. 1 of the accompanying drawings is illustrative of a conventional process of collecting reception status information from a radio communication system. According to the conventional process, as shown in FIG. 1, coverages of the radio communication system in which radio base stations 91, 92, 93 are connected to network 90 are visited by members of measuring teams with reception status measuring vehicles 94. At each measuring spot, one reception status measuring vehicle 94 measures reception status information in the corresponding coverage. The measured reception status information is recorded in association with the positional information that is measured by position measuring device 94a on reception status measuring vehicle 94.

Using the measured reception status information, the communication service provider performs maintenance and adjustments of the radio communication system to operate the radio communication system stably without fail.

According to another conventional process of collecting reception status information, the general mobile radio terminal owned by a user is used to measure reception status information, and the measured reception status information is collected from the mobile radio terminal (see, for example, JP-2002-152104-A). According to this conventional process, reception status information can quickly and easily be collected without the need for the reception status measuring vehicle shown in FIG. 1.

The above conventional processes suffer the following problems:

The process of measuring reception status information using reception status measuring vehicles 94 shown in FIG. 1 needs a measuring team of members including a vehicle driver, a navigator, and a measuring person for driving each reception status measuring vehicle 94 and making measurements at desired spots. Expenses required to purchase and maintain the measuring vehicles and personnel expenses required to collect reception status information are large and present an obstacle to efforts to lower the operating cost of the radio communication system. The conventional process shown in FIG. 1 takes a lot of time to collect reception status information because all the coverages of the radio communication system need to be visited by a limited number of reception status measuring vehicles.

Reception status information in the coverages may be measured by many measuring teams without reception status measuring vehicles 94. However, such a modification requires increased labor costs though reception status measuring vehicles 94 are dispensed with.

In a CDMA radio communication system, when users are connected to the system, the load on the radio communication system, i.e., an interference quantity, changes, and hence coverages of the radio communication system vary with time. In order to keep stable coverages while the number of users is being progressively grown to turn the system into a mature one, it is necessary to repeatedly collect reception status information periodically. Consequently, the CDMA radio communication system requires a much greater cost for collecting reception status information than other systems because reception status measuring vehicles need to travel repeatedly periodically for collecting reception status information.

Another problem of the CDMA radio communication system is that while reception status information is being measured by reception status measuring vehicles as they travel through coverages, the user status in the measured areas may change.

According to the process of collecting reception status information with the general mobile radio terminals owned by users as disclosed in JP-2002-152104-A, reception status information can be collected at a low cost because no reception status measuring vehicles and no measuring teams of various members are required. Since the coverages of the radio communication system are not visited by reception status measuring vehicles, but reception status information is measured by the mobile radio terminals owned by general users, a large amount of reception status information can be collected in a short period of time.

In the CDMA radio communication system, however, the reception status changes for various reasons, and changes in the reception status affect the operation of the radio communication system in various ways. For example, the reception status may change either with time or as the system load changes due to a user access congestion. Changes in the reception status may cause a change in the frequency of forced communication shutdowns from the network or a change in the frequency of handover failures.

The process disclosed in JP-2002-152104-A serves to collect only the relationship between reception status information and positional information, but fails to appropriately recognize causes of changes in the reception status and phenomena brought about by changes in the reception status.

SUMMARY OF THE INVENTION

It is therefore an object of the present invention to provide a method of and a system for, and a mobile radio terminal for, collecting information related to operation of a radio communication system inexpensively and easily.

To achieve the above object, an information collecting system according to the present invention collects information used for adjustments in a radio communication system for performing user communications.

At least one mobile radio terminal monitors a communication status of user communications. When the mobile radio terminal detects as a trigger when the communication status has satisfied a predetermined condition, the mobile radio terminal acquires a reception status of a radio signal and the position of its own. The mobile radio terminal sends measured information including the reception status and the position to an information collecting server. The information collecting server receives the measured information from the mobile radio terminal and records therein the measured information which has been received.

Therefore, the communication service provider of the radio communication system can instantaneously obtain many reception statuses in respective positions in coverages in relation to the communication status, and can instantaneously and effectively perform maintenance and adjustments of radio communication facilities. Thus, man-hours and expenses involved in collecting information can be reduced.

Instantaneous and accurate system adjustments are significant in an area where many users are present. According to the present invention, many items of measured information of such an area are obtained, making it possible to make instantaneous and accurate system adjustments using may items of measured information in an area where the need for system adjustments is high.

In another information collecting system according to the present invention, an information collecting server sends trigger information simultaneously to at least one mobile radio terminal. When the mobile radio terminal receives the trigger information as a measuring trigger, the mobile radio terminal acquires a reception status of a radio signal and the position of its own. The mobile radio terminal sends measured information including the reception status and the position to an information collecting server. The information collecting server records the measured information received from the mobile radio terminal.

Accordingly, many items of measured information at respective spots at the same time can instantaneously be obtained for instantaneously and effectively performing maintenance and adjustments of radio communication facilities.

In still another information collecting system according to the present invention, an information collecting server sends trigger information simultaneously to at least one mobile radio terminal. The mobile radio terminal monitors a communication status of user communications. When the mobile radio terminal detects as a trigger when the communication status has satisfied a predetermined condition, or receives the trigger information as a measuring trigger, the mobile radio terminal acquires a reception status of a radio signal and the position of its own. The mobile radio terminal sends measured information including the reception status and the position to an information collecting server. The information collecting server records the measured information received from the mobile radio terminal.

The above and other objects, features, and advantages of the present invention will become apparent from the following description with reference to the accompanying drawings which illustrate examples of the present invention.

DESCRIPTION OF THE PREFERRED EMBODIMENTS

Preferred embodiments of the present invention will be described in detail below.

Figure 2:
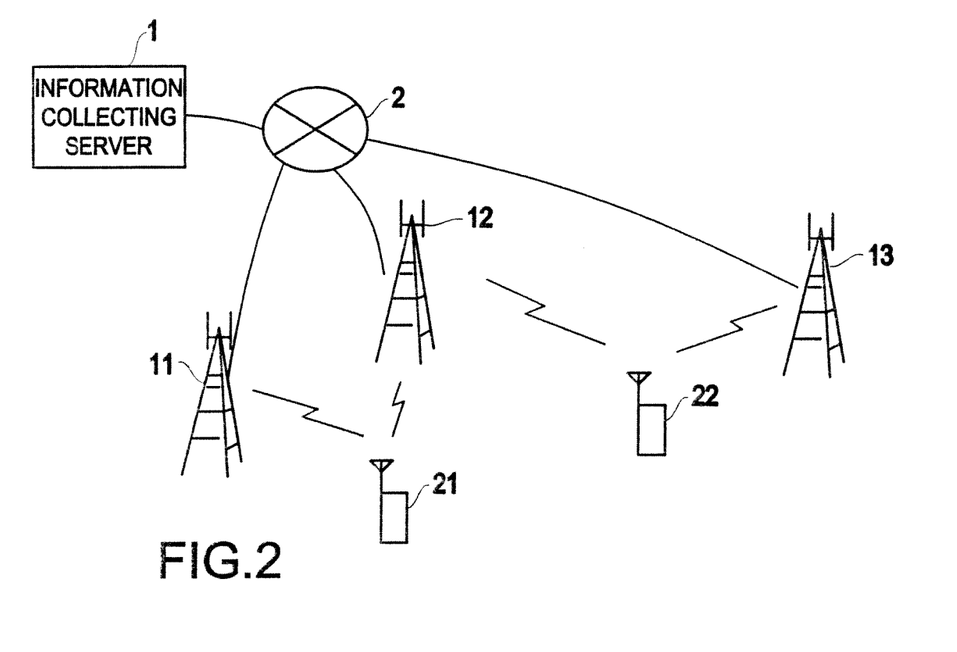
FIG. 2 is a schematic view of a radio communication system according to an embodiment of the present invention.

FIG. 2 schematically shows a radio communication system according to an embodiment of the present invention. As shown in FIG. 2, the radio communication system has radio base stations 11, 12, 13, network 2, and information collecting server 1. Mobile radio terminals 21, 22 can be connected to the radio communication system. In FIG. 2, only two mobile radio terminals are shown though many mobile radio terminals can actually be connected to the radio communication system. Actually, the radio communication system has many radio base stations, but only three radio base stations are shown in FIG. 2 for illustrative purposes.

Mobile radio terminals 21, 22 comprise mobile terminals of cellular phone systems, PHS, public radio LAN systems, etc. that users use in the radio communication system. The users who use mobile radio terminals 21, 22 are users who have consented to provide information about their own positions and the reception status of radio signals from radio base stations for stable operation of the radio communication system.

Figure 3:
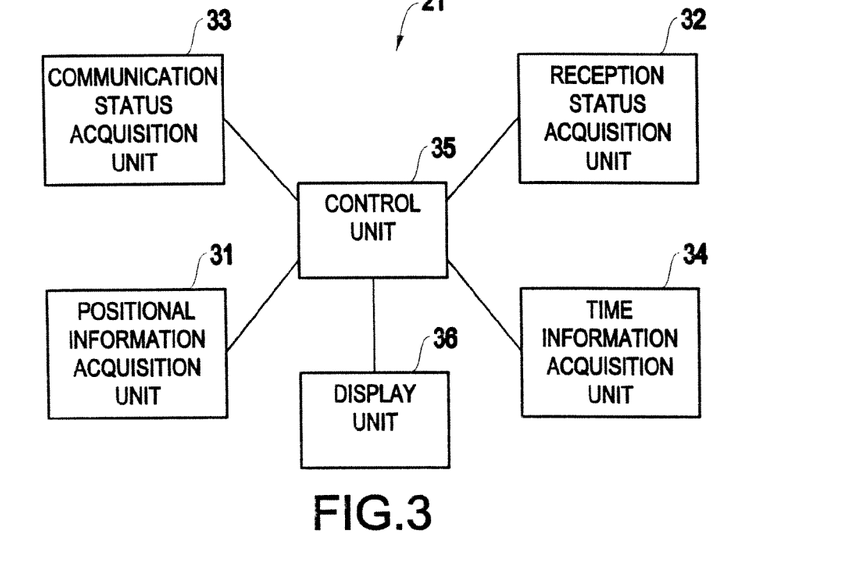
FIG. 3 is a block diagram of a mobile radio terminal according to the embodiment of the present invention.

FIG. 3 shows in block form details of mobile radio terminal 21 according to the present embodiment. Since mobile radio terminals 21, 22 are identical in arrangement, only mobile radio terminal 21 is shown in FIG. 3.

As shown in FIG. 3, mobile radio terminal 21 comprises positional information acquisition unit 31, reception status acquisition unit 32, communication status acquisition unit 33, time information acquisition unit 34, control unit 35, and display unit 36.

Positional information acquisition unit 31 acquires information representative of the position of mobile radio terminal 21. Positional information acquisition unit 31 measures its own position using a GPS (Global Positioning System), for example, and acquires the measured position as the positional information.

Reception status acquisition unit 32 acquires information representative of the reception status of a radio signal from a radio base station. The information representative of the reception status, i.e., the reception status information, is useful for the maintenance and adjustments of the radio communication system. Examples of the reception status information are Ec/Io (received signal power vs. interference power ratio per chip) indicative of a received signal quality of a common pilot channel in a CDMA radio communication system, and a received signal intensity in such a common pilot channel.

Communication status acquisition unit 33 can acquire information representative of the communication status of user communications. The information representative of the communication status, i.e., the communication status information, is information indicative of the status of communications that are performed using a radio signal. Examples of the communication status information are information indicating that the mobile radio terminal is unable to receive a radio signal from a radio base station and user communications are forcibly shut off, and information indicating that the mobile radio terminal is unable to make an outgoing call to another mobile radio terminal. Other examples of the communication status information are information indicating a handover failure and information indicating a communication throughput.

Time information acquisition unit 34 can acquire information representative of the time when reception status information is acquired, time information representative of the time when a reception status has started to be measured, and time information representative of the period of time for which a reception status has been measured.

When positional information, time information, and reception status information are acquired, control unit 35 sends the acquired information as measured information through either one of the radio base stations and network 2 to information collecting server 1. The measured information is information that includes positional information, time information, and reception status information.

When communication status information acquired by communication status acquisition unit 33 satisfies a predetermined condition, control unit 35 is triggered to instruct reception status acquisition unit 32 to acquire reception status information, instruct positional information acquisition unit 31 to acquire positional information, and instruct time information acquisition unit 34 to acquire a measuring start time and a measuring period of time. For example, when user communication such as a call or data communication are forcibly shut off, mobile ratio terminal 21 is triggered to acquire reception status information. Alternatively, mobile ratio terminal 21 may be triggered to acquire reception status information when the communication throughput becomes lower than a predetermined threshold value, or when a call is made to start user communications.

When control unit 35 receives information representative of a valuable point from information collecting server 1, control unit 35 displays the valuable point on display unit 36.

The valuable point is a point having a value corresponding to money, and is given to a user in return for the measured information provided by the user. An example of the valuable point is a point that can be used in electronic commerce on the Internet that is included in network 2. Another example of the valuable point is any of various cybercash and electronic money. Still another example of the valuable point is a point having a value in a core network of the radio communication system which is included in network 2, i.e., a point that can be used to offset a charge to be paid for using the radio communication system.

Display unit 36 displays valuable point information according to an instruction from control unit 35.

Radio base stations 11, 12, 13 are facilities for sending radio signals to and receiving radio signals from mobile radio terminals 21, 22, and comprise base stations in cellular phone systems or PHSs, or access points of radio LAN systems or the like.

Network 2 comprises a core network of the radio communication system according to the present embodiment, e.g., a network made up of mobile exchanges of a cellular phone system. In the present embodiment, network 2 also includes the Internet connected through a gateway (not shown).

Information collecting server 1 comprises a computer such as a workstation or the like. Information collecting server 1 receives and records measured information transmitted from mobile radio terminals 21, 22. When information collecting server 1 receives and records measured information transmitted from mobile radio terminals 21, 22, information collecting server 1 sends valuable point information that is to be given to the users of mobile radio terminals 21, 22, i.e., transmission sources, through network 2 and a radio base station to mobile radio terminals 21, 22.

Figure 4:
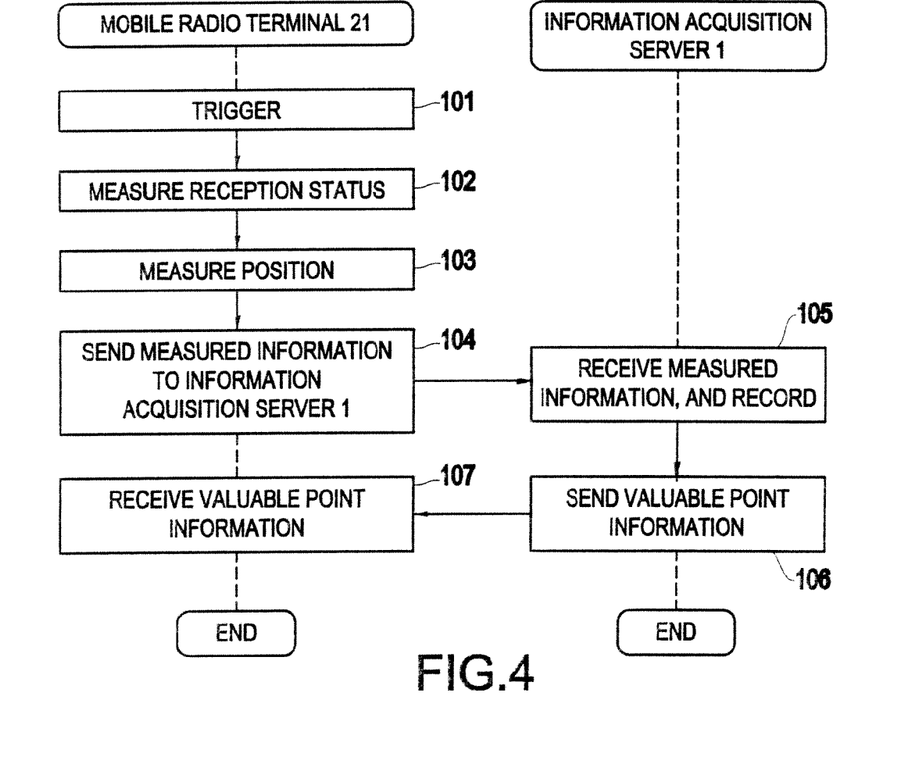
FIG. 4 is a flowchart of an operation sequence of the radio communication system and the mobile radio terminal according to the embodiment of the present invention for collecting reception status information.

FIG. 4 shows an operation sequence of the radio communication system and the mobile radio terminal according to the present embodiment for collecting reception status information. In FIG. 4, operation of only mobile radio terminal 21 and information collecting server 1 is illustrated.

Dedicated software is installed beforehand in the mobile radio terminal of a user who has consented to provide measured information including information about reception status information and positional information in return for the acquisition of a valuable point. The mobile radio terminal with the dedicated software installed is used as mobile radio terminals 21, 22. With the dedicated software installed, mobile radio terminals 21, 22 can automatically operate as follows:

As shown in FIG. 4, mobile radio terminal 21 monitors the communication status of user communications, and detects as a trigger when communication status information has satisfied a predetermined condition (step 101). When mobile radio terminal 21 detects the trigger, mobile radio terminal 21 measures a reception status and acquires reception status information indicative of the measured reception status (step 102). At this time, mobile radio terminal 21 also acquires time information. Instead of the operation in steps 101, 102, mobile radio terminal 21 may continuously measure a reception status at all times and, when mobile radio terminal 21 detects a trigger, it may use the reception status measured at the time for a subsequent process.

Then, mobile radio terminal 21 measures its own position using a GPS, and acquires positional information indicative of the measured position (step 103). However, mobile radio terminal 21 may not be able to acquire positional information depending on its position or environment. In that case, mobile radio terminal 21 may use positional information which it has acquired at a past time closest to the present time. Moreover, mobile radio terminal 21 should preferably add information indicative of low reliability to the positional information. Then, mobile radio terminal 21 sends measured information including the positional information, the time information, and the reception status information to information collecting server 1 (step 104).

In order to reflect the measured information early for system adjustments, mobile radio terminal 21 should preferably send the measured information including the reception status information and the positional information to information collecting server 1 immediately after mobile radio terminal 21 has acquired the reception status information and the positional information. If a forced shutdown of user communication or a handover failure is used as a trigger, then mobile radio terminal 21 is unable to send the measured information to information collecting server 1 immediately after the trigger is detected. In this case, mobile radio terminal 21 may send the measured information after the circuit becomes available again.

Information collecting server 1 receives the measured information from mobile radio terminal 21, and records the received information in its own memory (step 105). Actually, since information collecting server 1 receives measured information similarly from a plurality of mobile radio terminals, information collecting server 1 collects reception status information in various positions in coverages.

The measured information collected by information collecting server 1 is related to various operations of the radio communication system depending on trigger conditions. Consequently, not only a map representing an association between positions and reception statuses, but also maps related to various statuses are obtained. For example, a map of information that is acquired when user communications are forcibly disconnected is useful for estimating an area where a radio-wave arrival status is poor. A map of information that is acquired when a handover failure occurs is useful for estimating a position where there is a coverage interruption between radio base stations. A map of information that is acquired when a throughput is lower than a predetermined threshold value is useful for estimating a position where a communication quality is poor. A map of information that is acquired when a call is made is useful for estimating a position where many users are present.

The measuring time represented by the time information contained in the measured information is useful to estimate a time-dependent change in the communication status or the reception status.

Then, information collecting server 1 gives a valuable point to the user of mobile radio terminal 21, and sends valuable point information representative of a value (valuable point) given in return for the information provided by the user, to mobile radio terminal 21 (step 106). For non-delay system operation, information collecting server 1 should preferably send valuable point information is sent to mobile radio terminal 21 immediately after the measured information from mobile radio terminal 21. If a traffic buildup is to be prevented, however, information collecting server 1 may delay the timing to send valuable point information. For example, information collecting server 1 may collect several items of valuable point information and thereafter send the collected items of valuable point information. Information collecting server 1 may also send collected items of valuable point information late at night.

Actually, a valuable point may be given by different processes depending on the form of the variable point. For example, if a valuable point can be used to offset a charge to be paid for using the radio communication system, then it may be recorded and managed in information collecting server 1, a billing center (not shown), or a dedicated valuable point managing server. If a valuable point is in the form of electric money related to a bank account, then the valuable point may be sent to a bank server.

When measure information is thus collected by information collecting server 1, core network 2 of the radio communication system uses the collected information for the maintenance of radio base stations 11, 12, 13 and for adjusting various parameters including the transmission output power and the tilt angles of antennas.

According to the present embodiment, as described above, when a predetermined communication status is achieved, the mobile radio terminals of users acquire reception state information and positional information, and send measured information including the reception state information and the positional information to information collecting server 1. Therefore, the communication service provider can instantaneously obtain many items of measured information related to the communication status by giving inexpensive valuable points to users, and can instantaneously and effectively perform maintenance and adjustments of the radio base stations with reduced man-hours and expenses.

According to the present embodiment, furthermore, since many items of measured information can instantaneously be collected and reflected for system maintenance and adjustments, the measured information can provide outstanding advantages while the number of users is being progressively grown in a radio communication system, e.g., a CDMA radio communication system, where coverages change due to a load status or an interference quantity on radio circuits when mobile radio terminals are connected.

Moreover, instantaneous and accurate system adjustments are significant in an area where many users are present. Since many items of measured information of such an area are obtained, it is possible to make instantaneous and accurate system adjustments using many items of measured information in an area where the need for system adjustments is high.

According to the present embodiment, measured information is acquired only from the mobile radio terminals of users who have consented to provide positional information and reception status information. Therefore no information is automatically acquired from users who do not want to send positional information and reception status information to the communication service provider. The users are thus free from undue concerns from the standpoint of their privacy and electric power consumption by their mobile radio terminals.

Another embodiment of the present invention will be described below.

A radio communication system according to the present embodiment is identical in arrangement to the radio communication system shown in FIG. 2. However, the radio communication system according to the present embodiment operates differently from the operation sequence shown in FIG. 4 in that a trigger for mobile radio terminals 21, 22 to obtain measured information is given from information collecting server 1 simultaneously to a plurality of mobile radio terminals.

Figure 5:
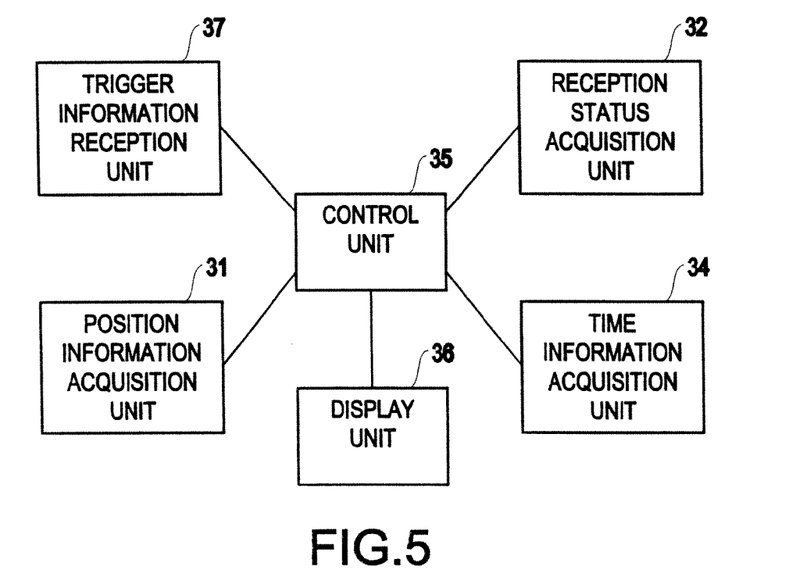
FIG. 5 is a block diagram of a mobile radio terminal according to another embodiment of the present invention.

FIG. 5 shows in block form a mobile radio terminal according to another embodiment of the present invention. The mobile radio terminal shown in FIG. 5 differs from the mobile radio terminal shown in FIG. 3 in that it has trigger information reception unit 37 instead of communication status acquisition unit 33.

Trigger information reception unit 37 receives trigger information from information collecting server 1, and sends the received trigger information to control unit 35. The trigger information is information for triggering the measurement of information. According to the present embodiment, information collecting server 1 can send trigger information simultaneously to a plurality of mobile radio terminals in order to cause the mobile radio terminals to start measuring information.

Control unit 35 is triggered by the reception of trigger information from information collecting server 1 to instruct reception status acquisition unit 32 to measure a reception status, instruct positional information acquisition unit 31 to measure positional information, and instruct time information acquisition unit 34 to acquire a measuring time, etc.

Figure 6:
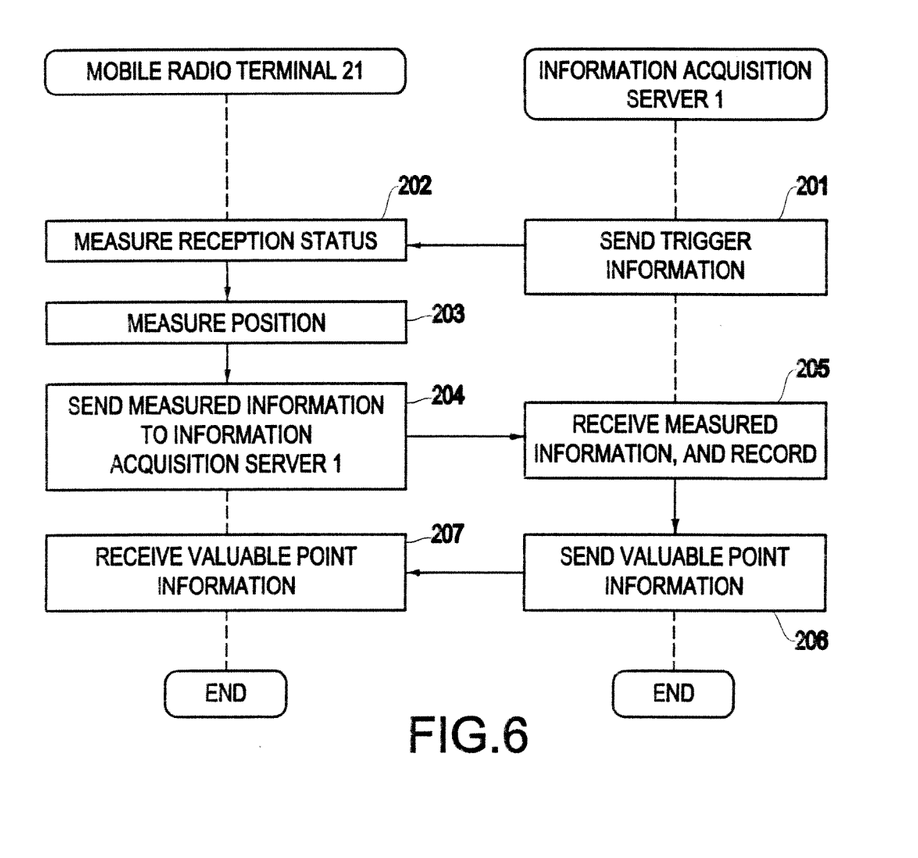
FIG. 6 is a flowchart of an operation sequence of the radio communication system and the mobile radio terminal according to the other embodiment of the present invention for collecting reception status information.

FIG. 6 shows an operation sequence of the radio communication system and the mobile radio terminal according to the present embodiment for collecting reception status information. In FIG. 6, operation of only mobile radio terminal 21 and information collecting server 1 is illustrated.

Dedicated software is installed beforehand in the mobile radio terminal of a user who has consented to provide measured information including reception status information and positional information in return for the acquisition of a valuable point. The mobile radio terminal with the dedicated software installed is used as mobile radio terminals 21, 22.

As shown in FIG. 6, information collecting server 1 sends trigger information simultaneously to a plurality of mobile radio terminals (step 201). For example, information collecting server 1 sends trigger information in a special time zone where a reception status is to be observed, such as a time zone in which the system load is statistically high or a time zone in which the system load is statistically low. In response to the trigger information, mobile radio terminal 21 measures a reception status and acquires the measured reception status as reception status information (step 202). At this time, mobile radio terminal 21 also acquires time information.

The subsequent processing in steps 203 through 207 is the same as the processing in steps 103 through 107 shown in FIG. 4.

The measured information collected by information collecting server 1 has been simultaneously acquired by a plurality of mobile radio terminals which have been triggered by the reception of the trigger information. Therefore, not only a map representing an association between positions and reception statuses, but also reception statuses in various positions in coverages at the same time are acquired. The information thus acquired is useful to estimate how changes in the reception statuses in the respective positions are related.

According to the present embodiment, as described above, mobile radio terminals are triggered by trigger information sent from information collecting server 1 simultaneously to a plurality of mobile radio terminals, to acquire reception status information and positional information, and send measured information including the reception state information and the positional information to information collecting server 1. Therefore, the communication service provider can instantaneously obtain many items of measured information at respective spots at the same time by giving inexpensive valuable points to users, and can instantaneously and effectively perform maintenance and adjustments of the radio base stations with reduced man-hours and expenses.

Another embodiment of the present invention will be described below.

A radio communication system according to the present embodiment is identical in arrangement to the radio communication system shown in FIG. 2. However, the radio communication system according to the present embodiment operates differently from the operation sequence shown in FIG. 4 in that triggers for mobile radio terminals 21, 22 to obtain measured information include a trigger given from information collecting server 1 simultaneously to a plurality of mobile radio terminals, as shown in FIG. 4, and a trigger which is detected by the mobile radio terminals themselves as shown in FIG. 4.

Figure 7:
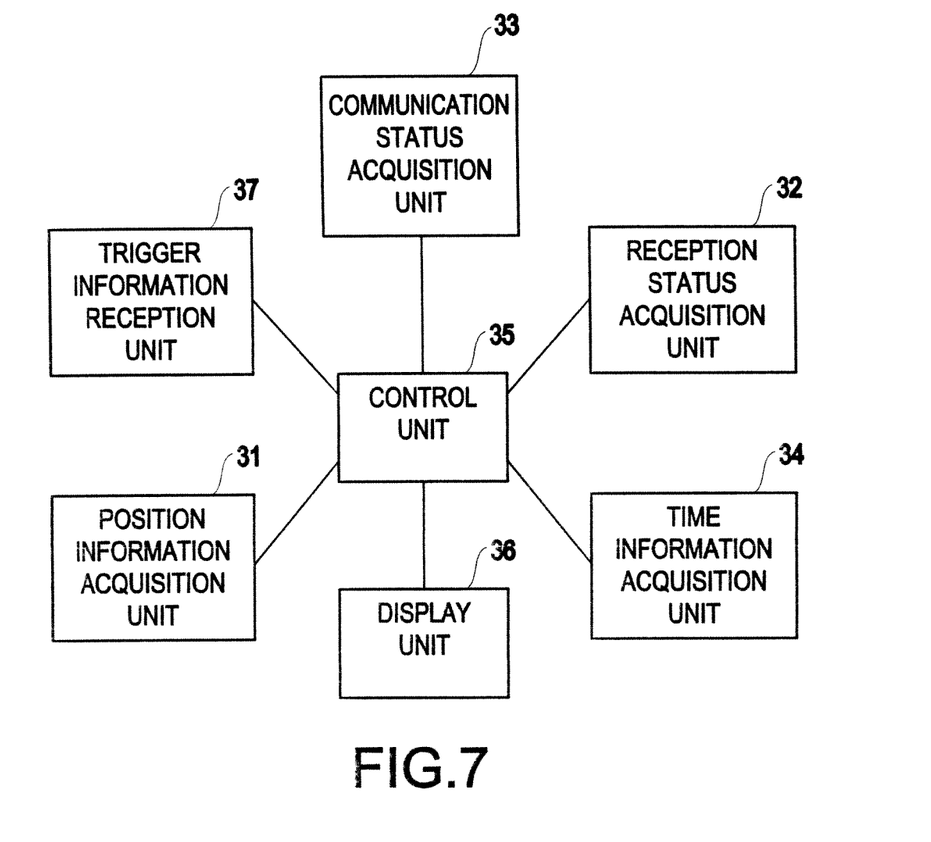
FIG. 7 is a block diagram of a mobile radio terminal according to still another embodiment of the present invention.

FIG. 7 shows in block form a mobile radio terminal according to this embodiment of the present invention. The mobile radio terminal shown in FIG. 7 differs from the mobile radio terminal shown in FIG. 3 in that it has both communication status acquisition unit 33 and trigger information reception unit 37. Communication status acquisition unit 33 shown in FIG. 7 is identical to communication status acquisition unit 33 shown in FIG. 3, and trigger information reception unit 37 shown in FIG. 7 is identical to trigger information reception unit 37 shown in FIG. 5.

When communication status information is acquired as a trigger by communication status acquisition unit 33 or when trigger information is received by trigger information reception unit 37, control unit 35 is triggered to instruct reception status acquisition unit 32, communication status acquisition unit 33, and time information acquisition unit 34.

Figure 8:
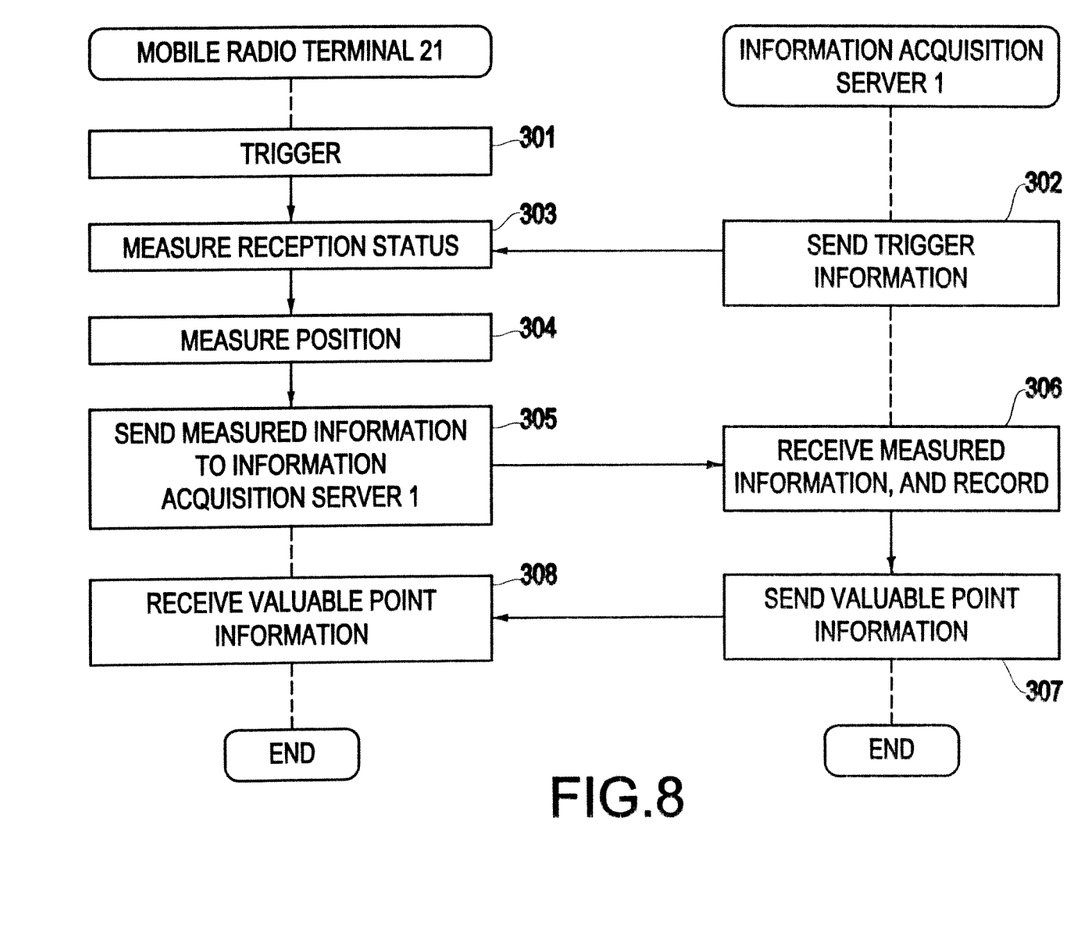
FIG. 8 is a flowchart of an operation sequence of the radio communication system and the mobile radio terminal according to the still other embodiment of the present invention for collecting reception status information.

FIG. 8 shows an operation sequence of the radio communication system and the mobile radio terminal according to the present embodiment for collecting reception status information. In FIG. 8, operation of only mobile radio terminal 21 and information collecting server 1 is illustrated.

Dedicated software is installed beforehand in the mobile radio terminal of a user who has consented to provide measured information including reception status information and positional information in return for the acquisition of a valuable point. The mobile radio terminal with the dedicated software installed is used as mobile radio terminals 21, 22.

As shown in FIG. 8, information collecting server 1 sends trigger information simultaneously to a plurality of mobile radio terminals (step 301), or mobile ratio terminal 21 detects as a trigger when communication status information has satisfied a predetermined condition (step 302).

When either trigger is generated, mobile ratio terminal 21 measures a reception status and acquires it as reception status information (step 303). At this time, mobile radio terminal 21 also acquires time information.

The subsequent processing in steps 304 through 308 is the same as the processing in steps 103 through 107 shown in FIG. 4.

The measured information collected by information collecting server 1 is related to various operations of the radio communication system or obtained at the same time, depending on trigger conditions. Consequently, not only a map representing an association between positions and reception statuses, but also maps related to various statuses or maps representative of reception statuses in various positions in coverages at the same time are acquired.

According to the present embodiment, as described above, mobile radio terminals are triggered by a certain communication status or trigger information sent from information collecting server 1 simultaneously to a plurality of mobile radio terminals, to acquire reception status information and positional information, and send measured information including the reception state information and the positional information to information collecting server 1. Therefore, the communication service provider can instantaneously obtain many items of measured information related to communication statuses and measured information at respective spots at the same time by giving inexpensive valuable points to users, and can instantaneously and effectively perform maintenance and adjustments of the radio base stations with reduced man-hours and expenses.

While preferred embodiments of the present invention have been described using specific terms, such description is for illustrative purposes only, and it is to be understood that changes and variations may be made without departing from the spirit or scope of the following claims.

What is claimed is:

1. A method of collecting information used for adjustments with an information collecting server in a radio communication system, said method comprising, in said information collecting server:
   sending a trigger command simultaneously to mobile radio terminals currently located in a service area of the information collecting server, so that any of said mobile radio terminals capable of doing so and in response to said trigger command will be instructed to:
      acquire a reception status of a radio signal for that mobile radio terminal;
      acquire a coordinate position of said mobile radio terminal; and
      send measured information including said reception status and said coordinate position to said information collecting server;
   recording said measured information received from said mobile radio terminals sending said measured information; and
   sending value information indicative of a value given for said measured information, which is provided to said mobile radio terminals when said measured information is received, such that the value indicated by said value information can be displayed in a mobile radio terminal when said value information is received.

2. The method according to claim 1, wherein said information collecting server sends said trigger command simultaneously to the mobile radio terminals based on a load status on a radio circuit.

3. The method according to claim 1, wherein said radio communication system comprises a CDMA radio communication system.

4. The method according to claim 1, wherein said acquiring a reception status comprises acquiring at least one of a received signal quality and a received signal intensity of a common channel.

5. The method according to claim 1, wherein said acquiring said coordinate position information comprises acquiring coordinate information of said mobile radio terminal by using GPS (Global Positioning System).

6. The method of claim 1, further comprising:
   providing said measured information as input data to a radio network design simulator;
   evaluating a performance in said service area, using said radio network design simulator; and
   making at least one adjustment in said service area based on said evaluating.

7. A method of collecting information used for adjustments with an information collecting server in a radio communication system connected to one or more mobile radio terminals for performing user communications, said method comprising, in said information collecting server:
   sending a trigger command simultaneously to all of the one or more mobile radio terminals to instruct any said mobile radio terminal capable of so doing to:
      monitor a communication status of a communication connection using a common pilot channel, wherein said communication status corresponds to whether or not the mobile radio terminal has an existing communication connection using a common pilot channel, which satisfies predetermined criteria;
      detect as a trigger when a change of said communication status has satisfied a predetermined condition; and
      when one of said trigger commands is received and said trigger is detected for said change of communication status:
         acquire a reception status of a radio signal;
         acquire a coordinate position of said mobile radio terminal; and
         send measured information including said reception status and said coordinate position to said information collecting server; and
   sending value information indicative of a value given for said measured information, which is provided to said mobile radio terminals when said measured information is received such that the value indicated by said value information can be displayed in a mobile radio terminal when said value information is received.

8. The method according to claim 7, wherein said predetermined condition comprises an occurrence of a forced disconnection of the user communication.

9. The method according to claim 7, wherein said predetermined condition comprises an occurrence of a handover failure.

10. The method according to claim 7, wherein said predetermined condition comprises a lowering of a throughput of said user communication below a predetermined threshold value.

11. The method according to claim 7, wherein said predetermined condition comprises a call which is made.

12. The method according to claim 7, wherein said information collecting server sends said trigger command simultaneously to the mobile radio terminals based on a load status on a radio circuit.

13. The method according to claim 7, wherein said acquiring said coordinate position information further includes acquiring coordinate information of said mobile radio terminal by using GPS (Global Positioning System).

14. A system for collecting information used for adjustments in a radio communication system for performing user communication, said system comprising:
   one or more mobile radio terminals for, when a trigger command is received, acquiring a reception status of a radio signal and a coordinate position of the mobile radio terminal and sending measured information including said reception status and said coordinate position; and
   an information collecting server that sends said trigger command simultaneously to all of the one or more mobile radio terminals, and recording the measured information which has been received from said one or more mobile radio terminals,
   wherein, when said measured information is received, said information collecting server sends value information indicative of a value given for said measured information, which is provided to said mobile radio terminals, and wherein, when said value information is received in a mobile radio terminal, said mobile radio terminal displays the value indicated by said value information.

15. The system according to claim 14, wherein said information collecting server sends said trigger command simultaneously to the one or more mobile radio terminals based on a load status on a radio circuit.

16. The system according to claim 14, wherein said radio communication system comprises a CDMA radio communication system.

17. The system according to claim 14, wherein said acquiring a reception status comprises acquiring at least one of a received signal quality and a received signal intensity of a common channel.

18. The system according to claim 14, wherein said acquiring said coordinate position information comprises acquiring coordinate information of said mobile radio terminal by using GPS (Global Positioning System).

19. A system for collecting information used for adjustments in a radio communication system for performing a user communication, said system comprising:
an information collecting server that sends a trigger command simultaneously to all of one or more mobile radio terminals currently located in a service area, and recording the measured information which is received from said mobile radio terminals,
wherein, for each mobile radio terminal capable of recognizing said trigger command and of monitoring a communication status of a communication connection using a common pilot channel, said communication status corresponding to whether or not the mobile radio terminal has an existing communication connection using the common pilot channel which satisfies predetermined criteria and, if a trigger is detected when a change of said communication status has satisfied a predetermined condition of one of said predetermined criteria, or a trigger command is received, said mobile terminal will acquire a reception status of a radio signal and a coordinate position of the mobile radio terminal and will send measured information including said reception status and said coordinate position to said information collecting server,
wherein, when said measured information is received, said information collecting server sends value information indicative of a value given for said measured information which is provided to said mobile radio terminal, and
wherein, when said value information is received, said mobile radio terminal displays the value indicated by said value information.

20. The system according to claim 19, wherein said predetermined condition comprises an occurrence of a forced disconnection of the user communication.

21. The system according to claim 19, wherein said predetermined condition comprises an occurrence of a handover failure.

22. The system according to claim 19, wherein said predetermined condition comprises a lowering of a throughput of said user communication below a predetermined threshold value.

23. The system according to claim 19, wherein said predetermined condition comprises a call which is made.

24. The system according to claim 19, wherein said information collecting server sends said trigger command simultaneously to the at least one mobile radio terminal based on a load status on a radio circuit.

25. The system according to claim 19, wherein said radio communication system comprises a CDMA radio communication system.

26. The system according to claim 19, wherein said acquiring a reception status further includes acquiring at least one of a received signal quality and a received signal intensity of a common channel.

27. The system according to claim 19, wherein said acquiring said coordinate position information further includes acquiring coordinate information of said mobile radio terminal by using GPS (Global Positioning System).

28. The system of claim 19, wherein a map of said predetermined condition or a trigger command is generated for said service area using said recorded measured information sent in by said mobile radio terminals.

29. A mobile radio terminal for sending information used for adjustments in a radio communication system for performing a user communication to an information collecting server, said mobile radio terminal comprising:
a trigger information reception unit that receives a trigger command from said information collecting server;
a reception status acquisition unit that acquires a reception status of a radio signal;
a positional information acquisition unit that acquires a coordinate position of the mobile radio terminal; and
a control unit, triggerable when said trigger command is received by said trigger information reception unit, that instructs said reception status acquisition unit to acquire said reception status and instructing said positional information acquisition unit to acquire said coordinate position, and, when said reception status and said coordinate position are acquired, sending measured information including said reception status and said coordinate position to said information collecting server,
wherein, when said measured information is received, said information collecting server sends value information indicative of a value given for said measured information which is provided, to said mobile radio terminal, and
wherein, when said value information is received, said mobile radio terminal displays the value indicated by said value information.

30. The mobile radio terminal according to claim 29, wherein said radio communication system comprises a CDMA radio communication system.

31. The mobile radio terminal according to claim 29, wherein said acquiring a reception status comprises acquiring at least one of a received signal quality and a received signal intensity of a common channel.

32. The mobile radio terminal according to claim 29, wherein said acquiring said coordinate position information comprises acquiring coordinate information of said mobile radio terminal by using GPS (Global Positioning System).

33. A method of collecting information used for adjustments with an information collecting server in a radio communication system, said method comprising, in said information collecting server:
sending a trigger command simultaneously to mobile radio terminals currently located in a service area of the information collecting server, so that any of said mobile radio terminals capable of doing so and in response to said trigger command will be instructed to:
acquire a reception status of a radio signal for that mobile radio terminal;
acquire a coordinate position of said mobile radio terminal; and send measured information including said reception status and said coordinate position to said information collecting server;

recording said measured information received from said mobile radio terminals sending said measured information; and generating a map of said service area using said recorded measured information sent in by said mobile radio terminals, wherein a plurality of maps of said service area is generated, based on said recorded measured information, said plurality of maps providing a basis to recognize causes of changes in reception statuses of said service area, wherein said plurality of maps of said service area comprises:

a first map representing an association between positions and reception statuses in said service area; and    one or more map of said service area for at least one of:

information showing where in said service area user communication are forcibly disconnected, for estimating an area where a radio-wave arrival status is poor;

information acquired when a handover failure occurs, for estimating positions of a coverage interruption between radio base stations in said service area;

information acquired when a throughput is lower than a predetermined threshold value, for estimating positions in said service area where a communication quality is poor; and       information acquired when a call is made, for estimating positions in said service area where many users are present.

34. The method of claim 1, wherein said mobile radio terminals additionally send time information to said information collecting server, said time information providing a basis to estimate time-dependent changes for said service area.

35. The method of claim 1, wherein said trigger command sent simultaneously to mobile radio terminals currently located in said service area of the information collecting server is received by all said mobile radio terminals in an entirety of said service area and all said mobile radio terminals in said entirety of said service area that are capable of responding to said trigger command provide appropriate responses, thereby information for said entirety of service area is reported in response to said trigger command.

* * * * *